United States Patent
Liu et al.

(10) Patent No.: US 12,236,503 B2
(45) Date of Patent: Feb. 25, 2025

(54) PET SYSTEM ATTENUATION CORRECTION METHOD BASED ON A FLOW MODEL

(71) Applicant: ZHEJIANG UNIVERSITY, Hangzhou (CN)

(72) Inventors: Huafeng Liu, Hangzhou (CN); Bo Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/788,732

(22) PCT Filed: Apr. 2, 2022

(86) PCT No.: PCT/CN2022/085009
§ 371 (c)(1),
(2) Date: Jun. 23, 2022

(87) PCT Pub. No.: WO2023/134030
PCT Pub. Date: Jul. 20, 2023

(65) Prior Publication Data
US 2024/0169608 A1    May 23, 2024

(30) Foreign Application Priority Data

Jan. 11, 2022 (CN) .......................... 202210046152.X (51) Int. Cl.
*G06T 11/00*     (2006.01)
*G06T 7/11*      (2017.01)
*G06T 7/30*      (2017.01)

(52) U.S. Cl.
CPC .............. *G06T 11/005* (2013.01); *G06T 7/11* (2017.01); *G06T 7/30* (2017.01); *G06T 11/006* (2013.01); *G06T 2207/10104* (2013.01)

(58) Field of Classification Search
CPC . G06T 11/005; G06T 7/11; G06T 7/30; G06T 11/006; G06T 2207/10104; G06T 11/00; G06T 11/008; G06N 3/08
See application file for complete search history.

(56) References Cited

U.S. PATENT DOCUMENTS

| 2015/0368612 A1* | 12/2015 | Palucka | ............... A61K 31/675 435/325 |
| 2019/0266728 A1* | 8/2019 | Lee | ........................ A61B 6/037 |

FOREIGN PATENT DOCUMENTS

| CN | 110809782 | 2/2020 |
| CN | 111105472 | 5/2020 |

(Continued)

OTHER PUBLICATIONS

Nuyts et al., "Reduction of attenuation correction artifacts in PET-CT", 2005 IEEE Nuclear Science Symposium Conference Record (Year: 2005).*

(Continued)

*Primary Examiner* — Qian Yang
(74) *Attorney, Agent, or Firm* — Jiwen Chen; Joywin IP Law PLLC (57) ABSTRACT

The present invention discloses a PET system attenuation correction method based on a flow model. The flow model adopted is a completely reversible model, the forward and reverse mappings share the same parameters, and the structure itself is a consistency constraint. The model utilizes the spatial correlation of adjacent slices, and adopts the structure of multi-slice input and single-slice output. The model consists of multiple reversible blocks, each of which consists of a enhanced affine coupling layer and a reversible 1×1 convolutional layer, and uses several small u-nets to learn the transformation parameters of the enhanced affine coupling layer. The present invention avoids additional CT or MR scanning, saves scanning cost for the patient, and (Continued)

reduces the damage of CT radiation to the patient; compared with similar methods, higher quality non-attenuation-corrected PET image can be obtained.

8 Claims, 4 Drawing Sheets

(56) References Cited

FOREIGN PATENT DOCUMENTS

| | | | |
|---|---|---|---|
| CN | 112419173 | | 2/2021 |
| CN | 112907589 | * | 6/2021 |
| CN | 113491529 | | 10/2021 |

OTHER PUBLICATIONS

Machine translation for CN 112907589 (Year: 2021).*
Yang et al. "Sinogram-based attenuation correction in PET/CT" Journal of X-Ray Science & Technology 24 (2016) 9-22.
Shiri et al. "Direct attenuation correction of brain PET images Using Only Emission Data via A Deep Convolutional Encoder-Decoder (Deep-DAC)", European Radiology, Jun. 2019.
Dong et al. "Deep learning-based attenuation correction in the absence of structural information for whole-body positron emission tomography imaging", 2019 Phys. Med. Biol.

* cited by examiner

PET SYSTEM ATTENUATION CORRECTION METHOD BASED ON A FLOW MODEL

This is a U.S. national stage application of PCT Application No. PCT/CN2022/085009 under 35 U.S.C. 371, filed Apr. 2, 2022 in Chinese, claiming priority of Chinese Application No. 202210046152.X, filed Jan. 11, 2022, all of which are hereby incorporated by reference.

TECHNICAL FIELD

The present invention belongs to the technical field of biomedical image analysis, and in particular relates to a PET (positron emission tomography) system attenuation correction method based on a flow model.

DESCRIPTION OF RELATED ART

Attenuation correction is an important step in quantitative positron emission tomography (PET) analysis, which improves the contrast of images and provides valuable information for doctors to diagnose. In clinical practice, additional computed tomography (CT) or magnetic resonance (MR) scans are required for attenuation correction of PET images, which increases the cost and time of patient examinations. In addition, CT imaging is radioactive, which is harmful to the human body and more harmful to pediatric patients. Although MR imaging is not radioactive, it does not contain attenuation information; so the anatomical structure of MR images is mainly used, but this often leads to incorrect attenuation correction results, especially in the lungs.

Recently, some deep learning based methods have been used to solve the problem of attenuation correction without CT. Some researchers first obtain synthetic CT images (sCT) from MR images or non-attenuation-corrected (NAC) PET images, and then use sCT for attenuation correction. However, there are some differences between the sCT images obtained by this method and the real CT images, When the erroneous sCT image is used for attenuation correction, the error is further passed on to the attenuation corrected PET image.

Other researchers have obtained attenuation corrected images directly from NAC images with good results, such as Yang et al. [Sinogram-based attenuation correction in PET/CT] and Shiri et al. [Direct attenuation correction of brain PET images], just allows the neural network to learn the conversion of NAC images to AC images from the data, and does not consider the consistency constraint, that is, the NAC images are obtained in reverse from the AC images. Adding consistency constraints can make the neural network converge to a more reliable solution and reduce the overfitting problem common in deep learning. Dong et al. [Deep learning-based attenuation correction in the absence of structural information for whole-body positron emission tomography imaging] adds consistency constraints by using CycleGAN, but the forward and reverse generators have independent parameters and are not exactly inverse functions of each other. In addition, the image is divided into patches during training and testing, which slows down the operation, and a checkerboard grid will appear when stitching image patches.

A flow model is a fully reversible model whose forward and reverse mappings share the same parameters, and the structure itself is a consistency constraint. Once the forward map is trained, the inverse map is determined, which has the advantage of solving the problem of PET attenuation correction.

SUMMARY OF THE INVENTION

In view of the above, the present invention provides a PET system attenuation correction method based on a flow model, which can avoid additional CT or MR scans, save scanning costs for patients, reduce the damage of CT radiation to patients, and can obtain higher quality PET image with attenuation correction.

A PET system attenuation correction method based on a flow model, comprising the steps:

(1) Collecting a CT data of a scanning object, then injecting a tracer into the scanning object, and using a PET system to scan and collect the sinogram data of the PET.

(2) Converting the CT image into an attenuation image at 511 KeV energy.

(3) Reconstructing a non-attenuation-corrected PET image based on the sinogram data, and then using the PET image to calculate a non-attenuation-corrected SUV image.

(4) Based on the sinogram data and the CT attenuation image, reconstructing an attenuation-corrected PET image, and using the PET image to calculate an attenuation-corrected SUV image.

(5) Establishing a flow model for attenuation correction, taking the non-attenuation-corrected SUV image as input, and using the attenuation-corrected SUV image as a ground truth label to train the flow model.

(6) Performing attenuation correction on the non-attenuation-corrected PET image reconstructed from the sinogram data by using the well-trained flow model.

Preferably, a scanning mode of the PET system in the step (1) can be either static scanning or dynamic scanning.

Preferably, in the step (2), converting the CT image into the attenuation image can adopt a stretching-based method, a segmentation-based method or a hybrid stretching-segmentation method.

Preferably, in the step (3), an analytical reconstruction method similar to filtered back-projection or an iterative reconstruction method can be used to reconstruct the non-attenuation-corrected PET image based on the sinogram data.

Preferably, in the step (3), the non-attenuation-corrected SUV image is calculated by the following formula:

$$SUV_i = \frac{C_{PET,i} \times \text{Weight}}{\text{Dose}}$$

wherein, $SUV_i$ is the SUV value of the ith voxel in the non-attenuation-corrected SUV image, $C_{PET,i}$ is the radioactive concentration value of the ith voxel in the non-attenuation-corrected PET image, Weight is the body weight of the scanning object, Dose is an injectable dose.

Preferably, in the step (4), in the process of reconstructing the attenuation-corrected PET image based on the sinogram data and the CT attenuation image, the CT attenuation image needs to be registered with the PET image.

Preferably, the flow model is composed of a cascade of multiple reversible modules, and the reversible module consists of a reversible 1×1 convolutional layer and connected with an enhanced affine coupling layer.

Preferably, the 1×1 convolutional layer is used to realize the permutation operation, that is, to disrupt the channel order of the input image, and using the matrix W to multiply the input image and then the output is provided to the affine coupling layer, the expression of the matrix W is as follows:

$$W=PL(U+\text{diag}(v))$$

Wherein, P is a permutation matrix, L is a lower triangular matrix with diagonal elements of 1, U is an upper triangular matrix with diagonal elements of 0, and v is a set of numerically learnable vectors.

Preferably, the affine coupling layer splits the input image into two parts M1 and M2 in half according to the channel, and then calculates N1 and N2 by the following formula, and finally outputs N1 and N2 after splicing according to the channel:

$$N1=M1+r(M2)$$

$$N2=M2\odot \exp(s(M1))+t(M1)$$

Wherein, ⊙ represents the Hadamard product, r( ), s( ) and t( ) are functions with independent parameters, which can be realized by neural network.

Preferably, in the step (5), the specific process of training the flow model is as follows:

5.1 Initializing model parameters, including randomly initializing a matrix W in the 1×1 convolutional layer, and initializing parameters in the affine coupling layer using the Xavier normal distribution.

5.2 Inputting the non-attenuation-corrected SUV image of the adjacent three slices into the model, and forward propagation to obtain three frames of the attenuation-corrected SUV image, and selecting the intermediate frame, that is, the attenuation-corrected SUV image corresponding to the intermediate slice as the final output.

5.3 Calculating a loss function between the SUV image output by the model and the attenuation-corrected SUV image.

5.4 According to the loss function, using the gradient descent method to iteratively update the model parameters until the loss function converges and the training is completed.

Preferably, the expression of the loss function is as follows:

$$\text{loss} = \|\hat{y}_1 - y_1\|_2^2 + \|\hat{y}_1 - y_1\|_1 + \lambda(\|\hat{y}_1 - y_0\|_2^2 + \|\hat{y}_1 - y_0\|_1) + \lambda(\|\hat{y}_1 - y_2\|_2^2 + \|\hat{y}_1 - y_2\|_1)$$

Wherein, loss is the loss function, $\hat{y}_1$ is the attenuation-corrected SUV image output by the model corresponding to the intermediate slice, $y_1$ is the ground truth label corresponding to the intermediate slice, $y_0$ and $y_2$ are the ground truth label corresponding to the previous slice and the rear slice respectively, λ is the regularization coefficient, and $\|\ \|_1$ and $\|\ \|_2$ represent the 1-norm and the 2-norm respectively.

Preferably, the step 5.2 is to use the training mode of multi-frame input and single-frame output.

The present invention proposes a reversible flow model, which directly obtains the AC PET SUV image from the NAC PET SUV image. The model utilizes the spatial correlation of adjacent slices and adopts the input form of multiple slices; the model consists of 8 reversible modules, each reversible module consists of an enhanced affine coupling layer and a reversible 1×1 convolutional layer. The present invention utilizes the structural reversibility of the flow model and adds consistency constraints to the proposed attenuation correction framework, which can alleviate the overfitting problem of deep learning to a certain extent and improve the accuracy of the results. In addition, the present invention does not need to scan additional CT or MR images for the attenuation-corrected SUV image, which can not only reduce the scanning cost and time of the patient, reduce the radiation damage of the CT to the patient, but also increase the patient throughput of the hospital and improve the diagnosis efficiency.

DETAILED DESCRIPTION OF THE INVENTION

In order to describe the present invention more specifically, the technical solutions of the present invention will be described in detail below with reference to the accompanying drawings and specific embodiments.

Figure 1:
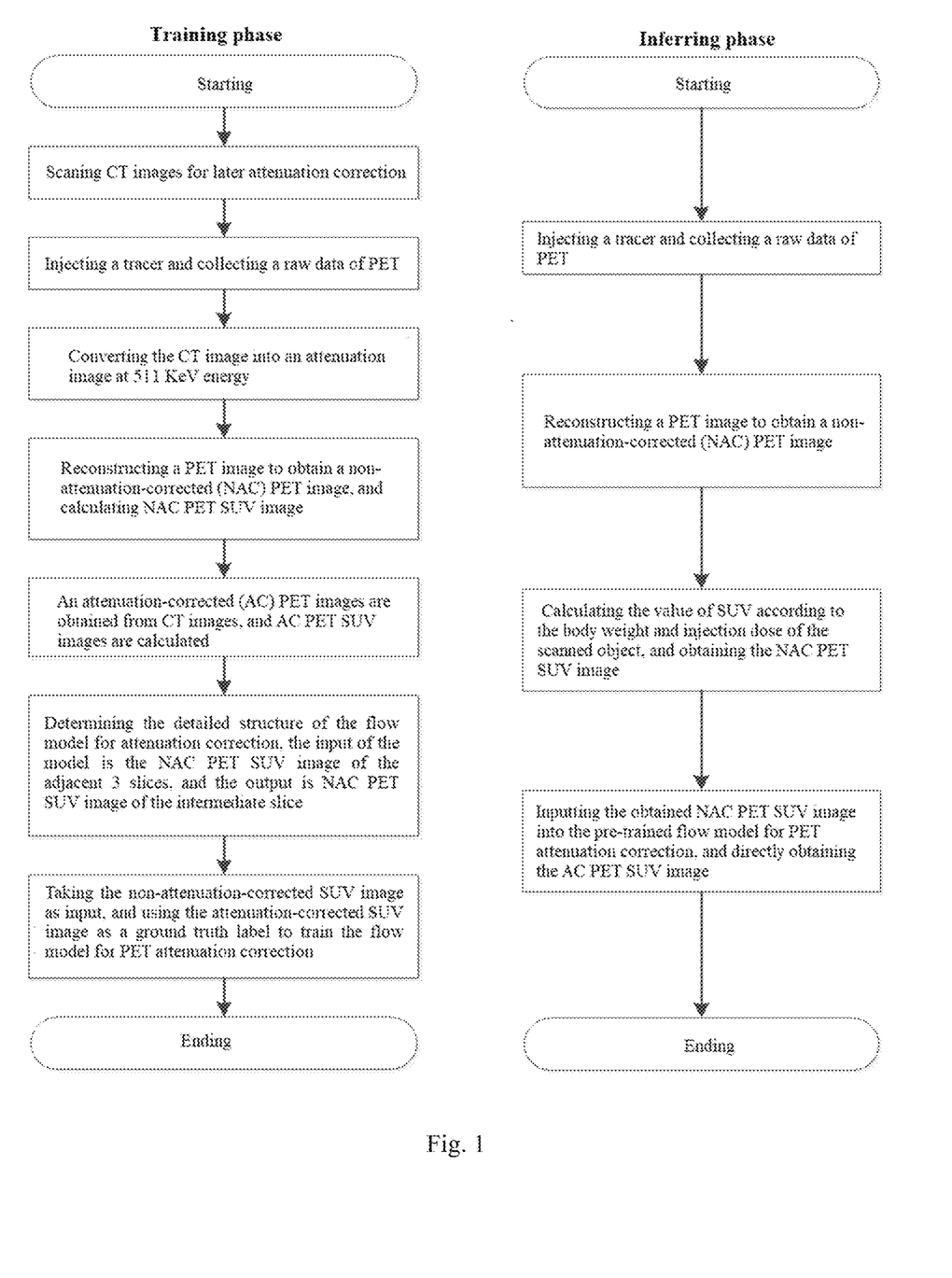
FIG. 1 is a schematic flow chart of the implementation of the method of the present invention.

As shown in FIG. 1, the PET system attenuation correction method based on the flow model of the present invention is divided into two stages as a whole.

Training Phase (1) Collecting CT data of a scanned object.

(2) Injecting a tracer into the scanned object, and collecting the raw data of PET, that is, the sinogram of PET. A scanning mode of the PET system in the step (1) can be either static scanning or dynamic scanning. According to the Poisson distribution of photons, a imaging model was established:

$$\bar{y}_i = \bar{A}_i s_i \Sigma_{j=1}{}' \eta_{ij} \hat{\lambda}_j + \rho_i + \sigma_i s_i$$

Wherein, $\bar{A}_i = \exp(-\Sigma_{j=1}{}' \hat{\mu}_j l_{ij})$, represents the sinogram expectation of the attenuation factor, and $\hat{\mu}$ is the estimated attenuation coefficient, i.e. the attenuation image; $\eta_{ij}$ is the probability that a pair of photons emitted by the jth voxel is detected by the ith bin of the sinogram; $l_{ij}$ represents the projected line i and the intersection length of the jth voxel; λ represents the estimated radioactive concentration distribution; s is the detection efficiency; σ is the scattered sinogram; ρ is the smoothed random sinogram; and J is the total number of voxel points.

(3) Converting the CT image into an attenuation image at 511 KeV energy. There can be many methods, including but not limited to stretch-based methods, segmentation-based methods, and hybrid stretching-segmentation method.

(4) A non-attenuation-corrected corrected PET image (NAC PET) is directly reconstructed without using an attenuation image; the reconstruction method can be either an analytical reconstruction method similar to filtered back projection, or an iterative reconstruction method. According to the body weight and injection dose of the scanned object, calculating the standard uptake value (SUV) to obtain the NAC PET SUV image. The calculation formula of SUV is as follows:

$$SUV = \frac{C_{PET} \times \text{Weight}}{\text{Dose}}$$

wherein, $C_{PET}$ represents the radioactive concentration of the PET image, Weight represents the patient's weight, and Dose represents the injected dose.

(5) Registering the attenuation map with the PET image, and using the CT-based attenuation image to reconstruct the attenuation-corrected PET image (AC PET); the reconstruction method can be either an analytical reconstruction method similar to filtered back projection, or Iterative reconstruction method. According to the body weight of the scanned object and the injected dose, the value of SUV was calculated, and the AC PET SUV image was obtained.

Figure 2:
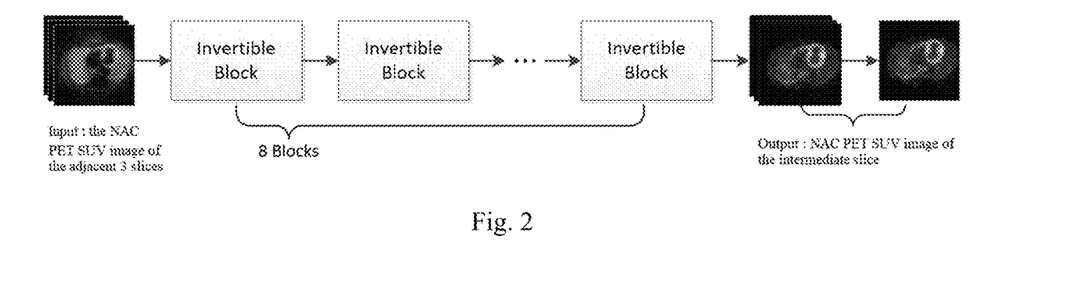
FIG. 2 is a schematic diagram of the overall structure of the flow model of the present invention.

(6) Determining the detailed structure of the flow model for attenuation correction, adopting the mode of multi-frame input and single-frame output, as shown in FIG. 2. The input of the model is the NAC PET SUV image of the adjacent three slices, and the output AC PET SUV image of the intermediate frame, the model is called AC-flow, and is composed of several reversible modules, each of which consists of a enhanced affine coupling layer and a reversible 1×1 convolutional layer.

Figure 3:
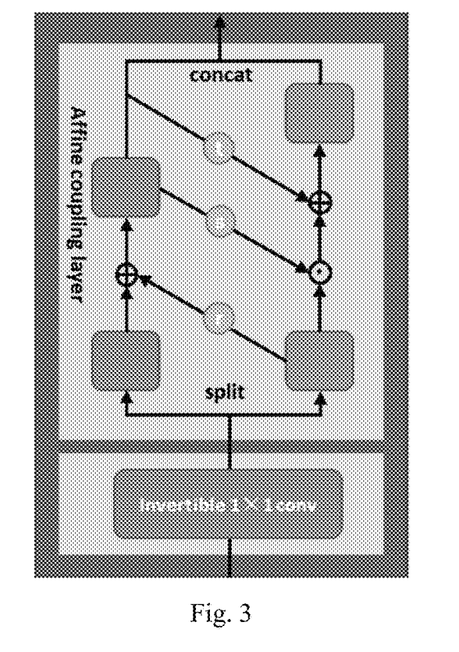
FIG. 3 is a schematic structural diagram of an affine coupling layer of the present invention.

The structure of the affine coupling layer is shown in FIG. 3. For the affine coupling layer, given the input image $m \in \mathbb{R}^{C \times H \times W}$, where C, H and W represent the total number of channels, image height and image width, the output image $n \in \mathbb{R}^{C \times H \times W}$ can be obtained by the following two formulas:

$$n_{1:c} = m_{1:c} + r(m_{c+1:C})$$

$$n_{c+1:C} = m_{c+1:C} \odot \exp(s(m_{1:c})) + t(m_{1:c})$$

Figure 4:
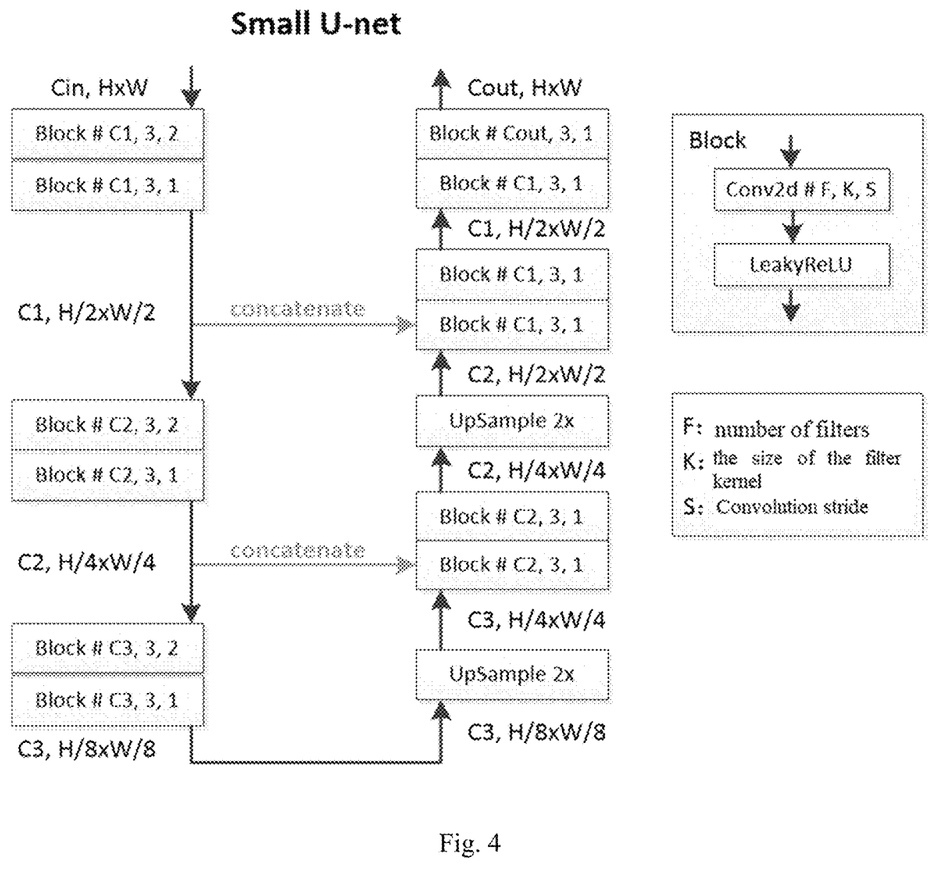
FIG. 4 is a schematic diagram of the detailed structure of the small u-net.

Wherein, c<C, ⊙ represents the Hadamard product, r( ), s( ) and t( ) are functions with independent parameters, which can be realized by neural network. This embodiment uses three small u-nets to independently learn functions r( ), s( ) and t( ), and FIG. 4 shows the detailed structure of the small u-nets. The inverse transform of the affine coupling layer can be expressed as the following formula:

$$m_{c+1:C} = (n_{c+1:C} - t(n_{1:c})) \odot \exp(-s(n_{1:c}))$$

$$m_{1:c} = n_{1:c} - r(m_{c+1:C})$$

From this formula, the input can be deduced losslessly from the output of the affine coupling layer.

The 1×1 convolutional layer is used to realize the permutation operation, that is, to disrupt the channel order of the input image, given the input $m \in \mathbb{R}^{C \times H \times W}$ and weight matrix $W \in \mathbb{R}^{C \times C}$, the output $n \in \mathbb{R}^{C \times H \times W}$ can be expressed as:

$$n_{i,j} = W m_{i,j}$$

The corresponding inverse transformation is:

$$m_{i,j} = W^{-1} n_{i,j}$$

In order to reduce the amount of computation, the LU matrix factorization is used to parameterize W:

$$W = PL(U + \text{diag}(v))$$

Wherein, P is a permutation matrix, L is a lower triangular matrix with diagonal elements of 1, U is an upper triangular matrix with diagonal elements of 0, and v is a set of numerically learnable vectors.

(7) A flow model for attenuation correction is trained with NAC PET SUV images as input and AC PET SUV images with CT-based attenuation correction as labels.

Initializing the flow model. For the reversible 1×1 convolutional layer, first sample a random rotation matrix W to initialize the parameters, and then calculating the corresponding value of P (keep unchanged during training) and the corresponding initial value of L, U, v, using Xavier normal distribution initializes other modules. During the training process, L is always constrained to be the lower triangular matrix with all 1 s on the diagonal, and other lower triangular elements except the diagonal are learnable; U has always been constrained to be the upper triangle with all 0 s on the diagonal Matrix, the other upper triangular elements except the diagonal are learnable; the element sign of the v vector remains unchanged (the same as the sign at initialization), and the absolute value of the element of the v vector is learnable.

The NAC PET SUV images of the adjacent 3 slices are input into the flow model, and forward propagation is performed to obtain 3 frames of images, and the intermediate frame is selected as the final output, that is, the AC PET SUV image of the intermediate slice. Calculating the loss function between the output AC PET SUV image of the intermediate slice and the CT attenuation corrected AC PET SUV image:

$$\text{loss} = \|\hat{y}_1 - y_1\|_2^2 + \|\hat{y}_1 - y_1\|_1 + \lambda(\|\hat{y}_1 - y_0\|_2^2 + \|\hat{y}_1 - y_0\|_1) + \lambda(\|\hat{y}_1 - y_2\|_2^2 + \|\hat{y}_1 - y_2\|_1)$$

Wherein, $\hat{y}_1$ represents the output AC PET SUV image of the intermediate slice, $y_1$ represents the label corresponding to the intermediate slice, $\|\hat{y}_1 - y_1\|_2^2 + \|\hat{y}_1 - y_1\|_1$ is the core loss function, used to constrain the output of the AC PET SUV image and the label of the intermediate slice are as close as possible. $y_0$ and $y_2$ denote the label of the previous slice and the next slice, respectively. $\|\hat{y}_1 - y_0\|_2^2 + \|\hat{y}_1 - y_0\|_1$ and $\|\hat{y}_1 - y_2\|_2^2 + \|\hat{y}_1 - y_1\|_2$ is the consistency loss function to constrain the intermediate slice image and the adjacent images are as close as possible, λ is the regularization parameter used to adjust the ratio between the core loss function and the consistency loss function.

Calculating the gradient of the loss function to each variable, and using the Adam optimizer to update the learnable parameters in the flow model until the value of the loss function is small enough or the number of epochs reaches the upper limit.

Inferring Phase (1) Injecting the tracer into the scanning object and collecting the raw data of PET.

(2) The NAC PET image is directly reconstructed without using the attenuation image.

(3) Calculating the SUV value according to the body weight and injection dose of the scanned object, and obtaining the NAC PET SUV image.

(4) Taking the NAC PET SUV image as input, and directly outputting the AC PET SUV image.

Below we conduct experiments based on patient cardiac gating data to verify the effectiveness of this embodiment.

The patient dataset used contains 36 patients, the injected tracer was 13N-Ammonia, the acquisition method was cardiac gated imaging, the scanning device was SIEMENS Biography 16 PET/CT, and the scanning time was 20 minutes; the data of the first 3 minutes are discarded, the remaining 17 minutes were constructed into NAC PET images and CT-AC PET images. The reconstructed images contained 16 gated time frames, each frame consisted of 65 slices with a size of 168×168, and normalized uptake value (SUV) images were calculated for each patient image, NAC PET SUV image and CT-AC PET SUV image directly used as input and labels without normalization.

The data set was randomly divided into training set (25 patients), validation set (6 patients) and test set (6 patients), the AC-flow proposed by the present invention was implemented using Pytorch 1.2.0, and was trained on Ubuntu 18.04 LTS server with TITAN RTX, Adam was used as the optimizer, the initial learning rate was 0.0005, the exponential decay factor was 0.9, and the batch size was 16, and online data augmentation of the training set by rotation, scaling, and flipping, and a total of 50 epochs were trained, evaluating the test set with the epoch with the best results on the validation set.

We evaluated the experimental results from two aspects: the whole image and the heart region. For the whole image, we adopted two metrics, SSIM and PSNR; for the cardiac region, 3D left ventricular myocardium was segmented using Carimas 2.10, and 3D masks were generated for patients in the test set to evaluate the performance of the proposed method; for the cardiac region, the evaluation indicators used were relative error (RE) and absolute error (AE).

The sizes of $c_1$, $c_2$ and $c_3$ in the AC-flow of the present invention are 32, 64, and 96, respectively, and the size of the regular parameter $\lambda$ in the loss was 0.1. Comparing the results of AC-flow with the current state-of-the-art Deep-DAC and DCNN. Both of these methods are encoder-decoder convolutional neural networks that realize the conversion from NAC PET images to AC PET images. DCNN takes multi-slice input, while Deep-DAC takes single-slice input. For a fair comparison, online data augmentation was performed on the two methods, the batch size was set to 16, and the model with the best performance on the validation set was selected to evaluate the performance on the test set.

Figure 5:
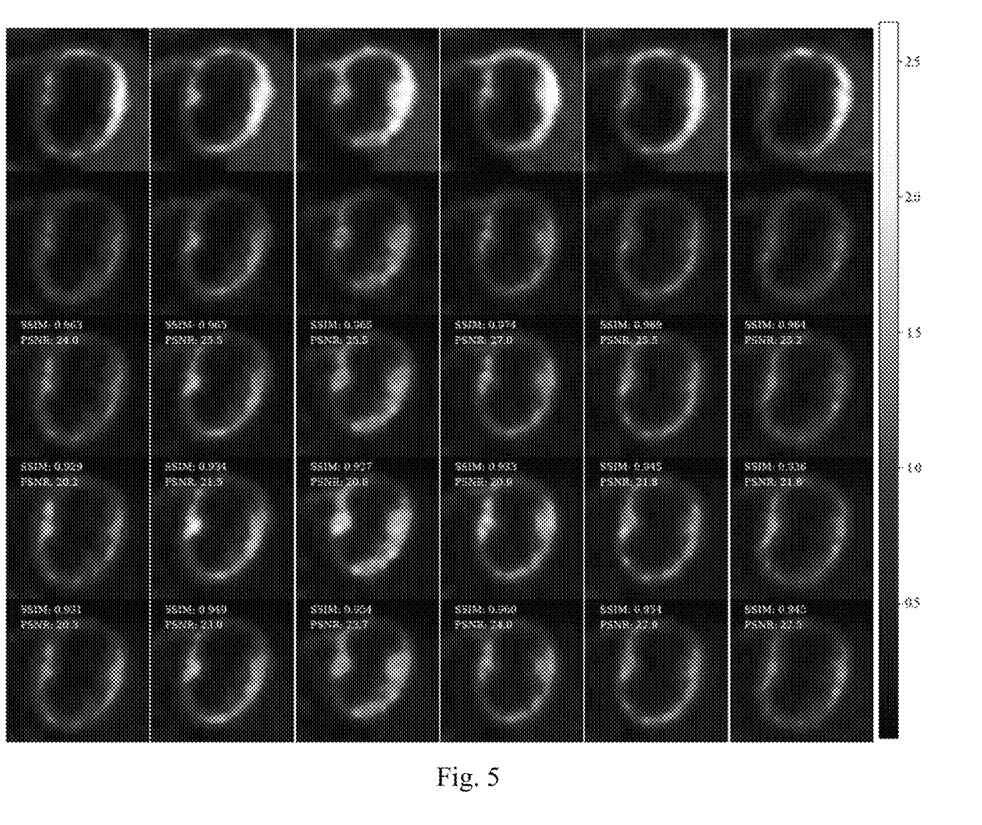
FIG. 5 shows the AC PET SUV images of 6 time frames obtained for the NAC PET SUV image of 13N-Ammonia under different methods; the first to fifth rows are the NAC PET SUV image, the label of the AC PET SUV image, and the AC-flow AC PET SUV image obtained, AC PET SUV image obtained by Deep-DAE, AC PET SUV image obtained by DCNN; Columns 1 to 6 are the 1st frame, the 4th frame, the 7th frame, the 10th frame, the 13th frame and the 16th frame.

Table 1 shows the evaluation indicators of different methods. The SSIM and PSNR of the images obtained by the AC-flow proposed by the present invention are the highest among the three methods, and the RE and AE in the heart region are the lowest. In terms of metrics, DCNN had an advantage over Deep-DAC, which showed that multi-slice input is better than single-slice input, although taking the same multi-slice input, AC-flow still outperformed DCNN, which may benefit from the reversible structure of AC-flow. The reversibility of AC-flow constitutes its own constraint, which enables the model to converge to a more reliable solution, alleviating the problem of overfitting. FIG. 5 shows the AC PET SUV images of the left ventricular region of a patient at different frames. For the left ventricular myocardium, the AC images of DCNN and AC-flow are closer to the label than Deep-DAC, which is consistent with the metrics in Table 1. The experimental results show that the method of the present invention has advantages in solving the PET attenuation correction image.

TABLE 1

|  | SSIM mean ± std | PSNR mean ± std | Bias mean ± std | Error mean ± std |
| --- | --- | --- | --- | --- |
| AC-flow | 0.9202 ± 0.0592 | 27.60 ± 5.10 | 0.1479 ± 0.0730 | 0.0956 ± 0.0500 |
| DCNN | 0.8957 ± 0.0814 | 26.66 ± 6.41 | 0.1545 ± 0.0911 | 0.1037 ± 0.0621 |
| Deep-DAC | 0.8786 ± 0.1027 | 25.34 ± 6.35 | 0.2113 ± 0.1245 | 0.1406 ± 0.0855 |

The above description of the embodiments is for the convenience of those of ordinary skill in the art to understand and apply the present invention. It will be apparent to those skilled in the art that various modifications to the above-described embodiments can be readily made, and the general principles described herein can be applied to other embodiments without inventive effort. Therefore, the present invention is not limited to the above-mentioned embodiments, and improvements and modifications made to the present invention by those skilled in the art according to the disclosure of the present invention should all fall within the protection scope of the present invention.

The invention claimed is:

1. A positron emission tomography (PET) system attenuation correction method based on a flow model, comprising the steps:
   (1) collecting a computed tomography (CT) data of a scanning object, then injecting a tracer into the scanning object, and using a PET system to scan and collect the sinogram data of the PET;
   (2) converting the CT image into an attenuation image at 511 KeV energy;
   (3) reconstructing a non-attenuation-corrected PET image based on the sinogram data, and then using the PET image to calculate a non-attenuation-corrected standardized uptake value (SUV) image;
   (4) based on the sinogram data and the CT attenuation image, reconstructing an attenuation-corrected PET image, and using the PET image to calculate an attenuation-corrected SUV image;
   (5) establishing a flow model for attenuation correction, taking the non-attenuation-corrected SUV image as input, and using the attenuation-corrected SUV image as a ground truth label to train the flow model; and
   (6) performing attenuation correction on the non-attenuation-corrected PET image reconstructed from the sinogram data by using the well-trained flow model;
   wherein, the flow model is composed of a cascade of multiple reversible modules, and the reversible module consists of a reversible 1×1 convolutional layer and connected with a enhanced affine coupling layer; and
   wherein, the 1×1 convolutional layer is used to realize the permutation operation, that is, to disrupt the channel order of the input image, and using the matrix W to multiply the input image and then the output is provided to the affine coupling layer, the expression of the matrix W is as follows:

$W = PL(U + \mathrm{diag}(v))$ wherein, P is a permutation matrix, L is a lower triangular matrix with diagonal elements of 1, U is an upper triangular matrix with diagonal elements of 0, and v is a set of numerically learnable vectors.

2. The PET system attenuation correction method based according to claim 1, wherein, a scanning mode of the PET system in the step (1) can be either static scanning or dynamic scanning.

3. The PET system attenuation correction method based according to claim 1, wherein, in the step (2), converting the CT image into the attenuation image can adopt a stretching-based method, a segmentation-based method or a hybrid stretching-segmentation method.

4. The PET system attenuation correction method based according to claim 1, wherein, in the step (3), the non-attenuation-corrected SUV image is calculated by the following formula:

$$SUV_i = \frac{C_{PET,i} \times \text{Weight}}{\text{Dose}}$$

wherein, $SUV_i$ is the SUV value of the ith voxel in the non-attenuation-corrected SUV image, $C_{PET,i}$ is the radioactive concentration value of the ith voxel in the non-attenuation-corrected PET image, Weight is the body weight of the scanning object, Dose is an injectable dose.

5. The PET system attenuation correction method based according to claim 1, wherein, in the step (3), an analytical reconstruction method similar to filtered back-projection or an iterative reconstruction method is used to reconstruct the non-attenuation-corrected PET image based on the sinogram data; and in the step (4), in the process of reconstructing the attenuation-corrected PET image based on the sinogram data and the CT attenuation image, the CT attenuation image is registered with the PET image.

6. The PET system attenuation correction method based according to claim 1, wherein, the affine coupling layer splits the input image into two parts M1 and M2 in half according to the channel, and then calculates N1 and N2 by the following formula, and finally outputs N1 and N2 after splicing according to the channel:

$$N1 = M1 + r(M2)$$

$$N2 = M2 \odot \exp(s(M1)) + t(M1)$$

wherein, $\odot$ represents the Hadamard product, r( ), s( ) and t( ) are functions with independent parameters, which can be realized by neural network.

7. The PET system attenuation correction method based according to claim 1, wherein, in the step (5), the specific process of training the flow model is as follows:

5.1 initializing model parameters, including randomly initializing a matrix W in the 1×1 convolutional layer, and initializing parameters in the affine coupling layer using the Xavier normal distribution;

5.2 inputting the non-attenuation-corrected SUV image of the adjacent three slices into the model, and conducting forward propagation to obtain three frames of the attenuation-corrected SUV image, and selecting the intermediate frame, that is, the attenuation-corrected SUV image corresponding to the intermediate slice as a final output;

5.3 calculating a loss function between the SUV image output by the model and the attenuation-corrected SUV image;

5.4 according to the loss function, using the gradient descent method to iteratively update the model parameters until the loss function converges and the training is completed.

8. The PET system attenuation correction method based according to claim 7, wherein, the expression of the loss function is as follows:

$$\text{loss} = \|\hat{y}_1 - y_1\|_2^2 + \|\hat{y}_1 - y_1\|_1 + \lambda \left( \|\hat{y}_1 - y_0\|_2^2 + \|\hat{y}_1 - y_0\|_1 \right) + \lambda \left( \|\hat{y}_1 - y_2\|_2^2 + \|\hat{y}_1 - y_2\|_1 \right)$$

wherein, loss is the loss function, $\hat{y}_1$ is the attenuation-corrected SUV image output by the model corresponding to the intermediate slice, $y_1$ is the ground truth label corresponding to the intermediate slice, $y_0$ and $y_2$ are the ground truth label corresponding to the previous slice and the rear slice respectively, $\lambda$ is the regularization coefficient, and $\|\ \|_1$ and $\|\ \|_2$ represent the 1-norm and the 2-norm respectively.

\* \* \* \* \*